(12) United States Patent
Liu et al.

(10) Patent No.: US 6,654,185 B1
(45) Date of Patent: Nov. 25, 2003

(54) ELECTROMAGNETIC ACTUATOR HAVING SPECIFIC COIL ARRANGEMENT FOR IMPROVING UTILIZATION RATE OF MAGNETIC CIRCUIT THEREOF

(75) Inventors: Chin-Sung Liu, Miou-Li (TW); Li-Chung Peng, Shin-Chu (TW); An-Ying Huang, Tainan (TW)

(73) Assignee: Acute Applied Technologies Inc. (TW)

( * ) Notice: Subject to any disclaimer, the term of this patent is extended or adjusted under 35 U.S.C. 154(b) by 0 days.

(21) Appl. No.: 09/711,524

(22) Filed: Nov. 14, 2000

(51) Int. Cl.[7] .............................. G02B 7/02; G11B 21/02
(52) U.S. Cl. ..................... 359/814; 359/824; 369/44.22
(58) Field of Search .......................... 335/266; 359/813, 359/814, 824; 369/44.22; 360/266.2, 294.2, 266.7, 266.8, 266.9; 310/90.5, 12, 15, 13, 14, 16, 17, 18, 19, 20–24

(56) References Cited

U.S. PATENT DOCUMENTS

| | | | | |
|---|---|---|---|---|
| 4,318,038 A | * | 3/1982 | Munehiro | 310/13 |
| 4,554,653 A | * | 11/1985 | Malissin et al. | 369/44.16 |
| 4,842,392 A | * | 6/1989 | Nakamura et al. | 359/814 |
| 5,189,660 A | * | 2/1993 | Caldwell | 360/266.7 |
| 5,693,990 A | * | 12/1997 | Miyazaki | 248/550 |
| 5,698,911 A | * | 12/1997 | Dunfield et al. | 310/12 |
| 5,787,067 A | * | 7/1998 | Song | 369/247 |
| 5,939,804 A | * | 8/1999 | Nakao et al. | 310/12 |
| 6,178,142 B1 | * | 1/2001 | Fujita | 369/13.15 |
| 6,278,669 B1 | * | 8/2001 | Anzai et al. | 369/44.14 |
| 6,323,568 B1 | * | 11/2001 | Zabar | 310/12 |
| 6,462,893 B1 | * | 10/2002 | Suzuki et al. | 359/814 |

* cited by examiner

Primary Examiner—Burton S. Mullins
(74) Attorney, Agent, or Firm—Lowe Hauptman Gilman & Berner, LLP

(57) ABSTRACT

An electromagnetic actuator with an improved utilization rate of magnetic circuit for efficiently moving an objective lens on micro levels along a focusing direction and a tracking direction is disclosed. The electromagnetic actuator includes two homopolar parts spaced with a clearance small enough for generating magnetic force lines including a first and a second smooth portions which are preferably linear. The electromagnetic actuator further includes a first and a second actuating coil sets connected to the holder of the objective lens for moving the objective lens along the focusing and the tracking directions, respectively. The first and the second actuating coil sets are arranged around the homopolar parts with coil walls thereof substantially perpendicular to the first and the second smooth portions, respectively, so that they themselves move in the focusing and/or tracking directions in response to the currents and the magnetic force lines applied thereto to actuate the lens holder.

14 Claims, 7 Drawing Sheets

ELECTROMAGNETIC ACTUATOR HAVING SPECIFIC COIL ARRANGEMENT FOR IMPROVING UTILIZATION RATE OF MAGNETIC CIRCUIT THEREOF

FIELD OF THE INVENTION

The present invention relates to an electromagnetic actuator for moving an object, e.g., an objective lens of an optical head, on a micro level, and more particularly to an electromagnetic actuator having specific coil arrangement for improving the utilization rate of magnetic circuit so as to quickly perform the micro-level movement of the object.

BACKGROUND OF THE INVENTION

In general, the writing and reading operations of an information writing/reading apparatus are performed by a disk-shaped recording medium such as a compact disk or a magneto-optical disk. For reading information from a disk, an optical head including an objective lens is used to guide the laser beam reflected off of the disk to a photosensor.

Unfortunately, a general disk is hard to be perfectly flat and symmetric, i.e. it may have inevitable warpage and eccentricity to some extent. Therefore, the information writing/reading apparatus preferably includes means for moving the objective lens in response to the deviations resulting from the variable warpage and/or eccentricity of the disk. The movement is generally performed on a micro level along two orthogonal directions, i.e. a focusing direction perpendicular to the disk face and a tracking direction parallel to the disk face, to compensate the focusing deviation and the tracking deviation, respectively.

In order to move the objective lens on a micro level, objective lens actuators are developed. For the actuators using electromagnetic forces as driving power, a tracking coil, a focusing coil and a permanent magnet are involved and specifically arranged.

Please refer to FIGS. 1, 2 and 3 which schematically show three kinds of conventional arrangement of the tracking coil 11, the focusing coil 12 and the permanent magnet 13. According to the proportion of the magnetic force lines passing through the coils, the utilization rate of the magnetic circuit of FIG. 1 or 2 is estimated to be 30% to 40%, and that of FIG. 3 is about 50%.

With the enhancement of writing and reading speeds, the tracking and focusing operations are required to be highly responsive. If the utilization rate of the magnetic circuit is relatively low, the driving power is not enough for the application of high-speed writing and reading operations.

SUMMARY OF THE INVENTION

Therefore, an object of the present invention is to provide an electromagnetic actuator with improved responsive speed by increasing the utilization rate of the magnetic circuit, which has a particular coil arrangement.

According to a first aspect of the present invention, an electromagnetic actuator for moving an object along a first direction includes a first actuating coil set connected to the object for generating a first actuating force to move the object in the first direction in response to a first current density therein and a first magnetic force; and a magnetic force line generator surrounded by the first actuating coil set, and including two homopolar parts disposed with a clearance small enough for generating magnetic force lines including a first substantially linear portion due to a repelling force between the two homopolar parts, wherein the first substantially linear portion of magnetic force lines provides the first magnetic force for the first actuating coil set.

Preferably, the magnetic force line generator includes two permanent magnets having respective homopoles facing each other as the two homopolar parts.

In an embodiment, the first direction is a focusing direction, and the first actuating coil set includes a coil holding the magnetic force line generator therein.

Preferably, the electromagnetic actuator further moves the object along a tracking direction perpendicular to the focusing direction. Therefore, the electromagnetic actuator preferably further includes a second actuating coil set connected to the object for generating a second actuating force to move the object in the tracking direction in response to a second current density therein and a second magnetic force. The magnetic force lines further includes a second substantially linear portion due to the repelling force between the two homopolar parts, wherein the second substantially linear portion of magnetic force lines provides the second magnetic force for the second actuating coil set.

Preferably, the second actuating coil set consists of two coils disposed at two opposite sides of the magnetic force line generator, respectively, each of which has a coil wall thereof substantially perpendicular to the second substantially linear portion.

In another embodiment, the first direction is a tracking direction, and the first actuating coil set includes two coils sandwiching the magnetic force line generator therebetween.

Preferably, the electromagnetic actuator further moves the object along a focusing direction perpendicular to the tracking direction. Therefore, the electromagnetic actuator preferably further includes a second actuating coil set connected to the object for generating a second actuating force to move the object in the focusing direction in response to a second current density therein and a second magnetic force. The magnetic force lines further includes a second substantially linear portion due to the repelling force between the two homopolar parts, wherein the second substantially linear portion of magnetic force lines provides the second magnetic force for the second actuating coil set.

Preferably, the second actuating coil set includes a coil holding the magnetic force line generator therein, which has a coil wall thereof substantially perpendicular to the second substantially linear portion.

According to a second aspect of the present invention, an electromagnetic actuator is provided for moving an object along a first direction and a second direction. The electromagnetic actuator includes a magnetic force line generator including two homopolar parts spaced with a clearance small enough for generating magnetic force lines including a first substantially linear portion and a second substantially linear portion due to a repelling force between the two homopolar parts, wherein the first and second substantially linear portions are not parallel; a first actuating coil set connected to the object and arranged around the magnetic force line generator with a coil wall thereof substantially perpendicular to the first substantially linear portion for moving the object in the first direction in response to a first current density therein and the first substantially linear portion; and a second actuating coil set connected to the object and located at the lateral end of the magnetic force line generator with a coil wall thereof substantially perpendicular to the second substantially linear portion for moving the object in the second direction in response to a second current density and the second substantially linear portion, wherein the first and second actuating coil sets are not substantially parallel.

According to a third aspect of the present invention, an electromagnetic actuator for moving an object along a first direction and a second direction includes a first actuating coil set connected to the object for generating a first actuating force to move the object in the first direction in response to a first current therein and a first magnetic force; a second actuating coil set connected to the object for generating a second actuating force to move the object in the second direction in response to a second current therein and a second magnetic force, wherein the first and second actuating coil sets are not substantially parallel; and a magnetic force line generator including two spaced homopolar parts which is surrounded by the first actuating coil set, and sandwiched by the second actuating coil set for providing the first and second magnetic forces for the first and second actuating coil sets, respectively, by generating magnetic force lines due to a repelling force therebetween, wherein the first and second magnetic forces are not substantially parallel.

BRIEF DESCRIPTION OF THE DRAWINGS

The present invention may best be understood through the following description with reference to the accompanying drawings, in which:

FIGS. 3A and 3B are schematic diagrams showing the coil arrangement of a third conventional electromagnetic actuator wherein FIG. 3B is a cross-sectional view taken along an A–A' line of FIG. 3A;

FIGS. 4A~4C are schematic diagrams showing the coil arrangement of a preferred embodiment of an electromagnetic actuator according to the present invention wherein FIG. 4B is a cross-sectional view taken along a B—B line of FIG. 4A and FIG. 4C is a top plane view of FIG. 4A;

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
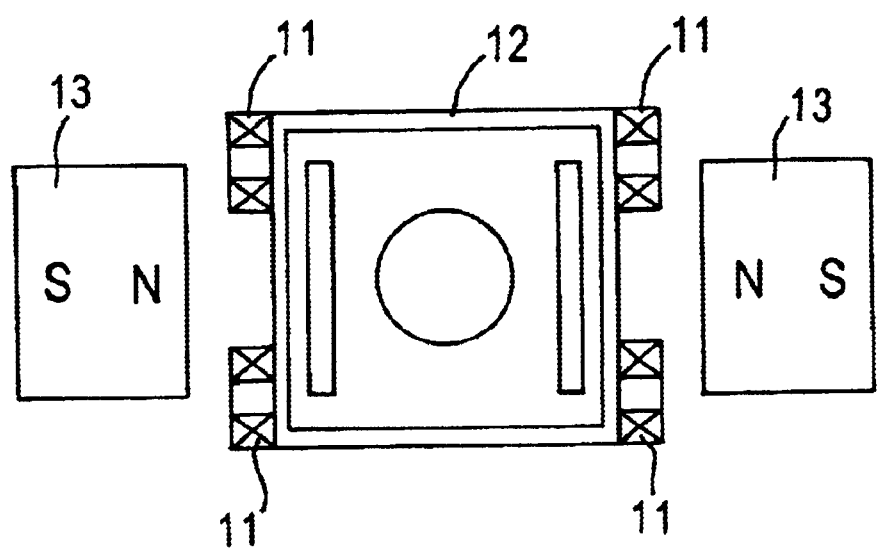
FIG. 1 is a schematic diagram showing the coil arrangement of a first conventional electromagnetic actuator.
Figure 2:
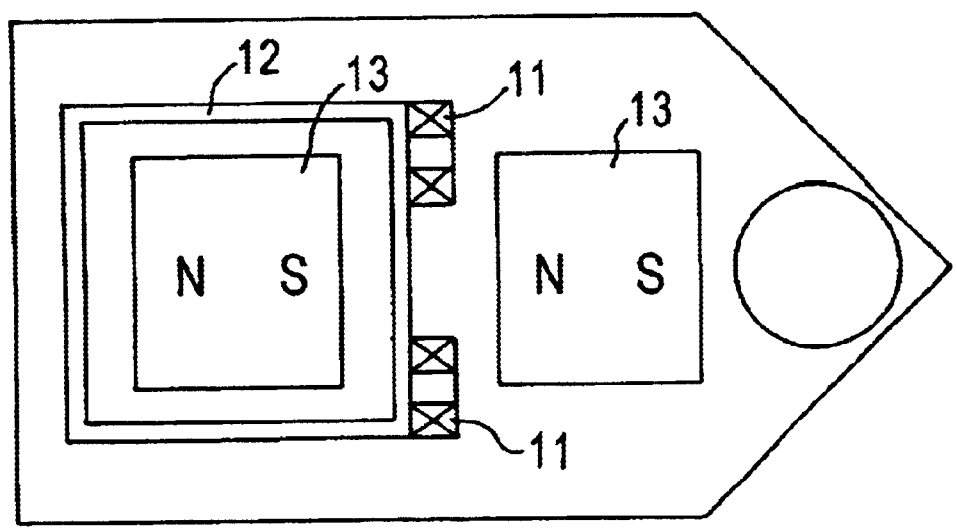
FIG. 2 is a schematic diagram showing the coil arrangement of a second conventional electromagnetic actuator.
Figure 3A:
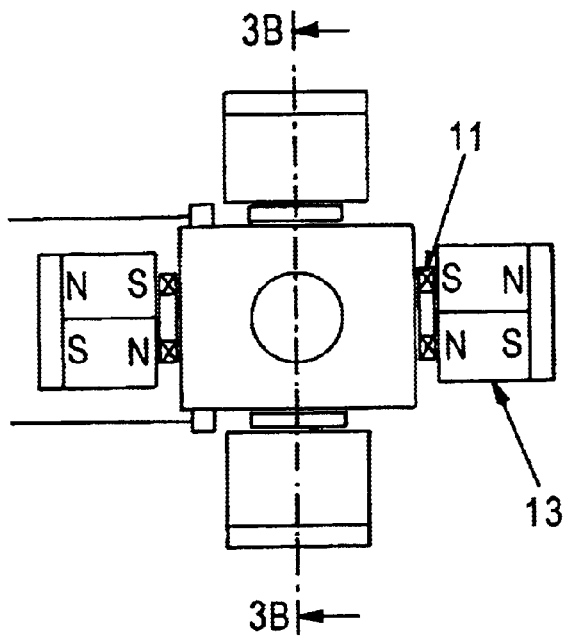
Figure 3B:
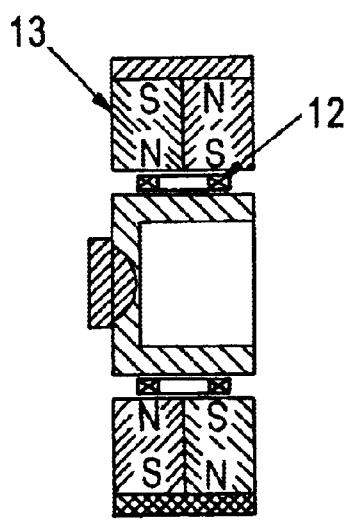
Figure 4A:
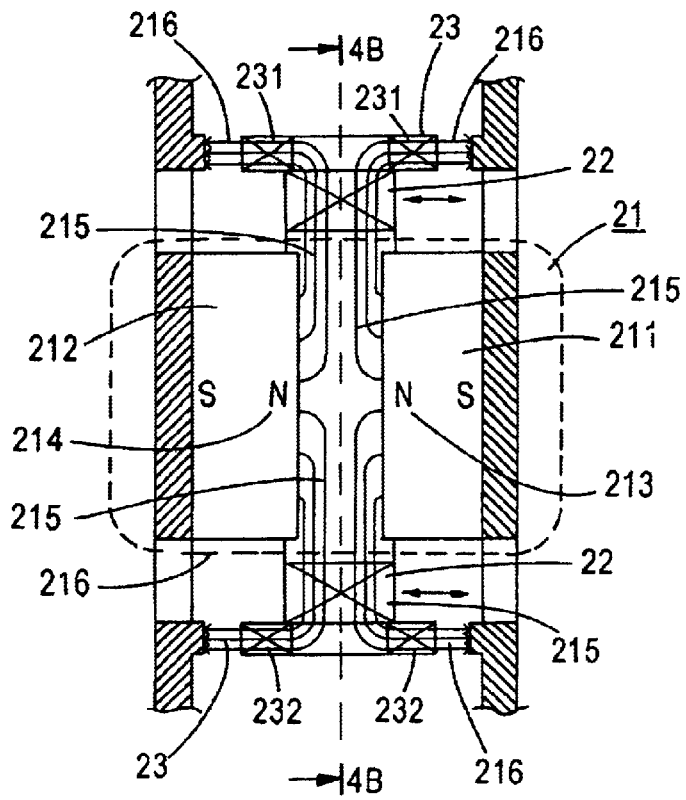
Figure 4B:
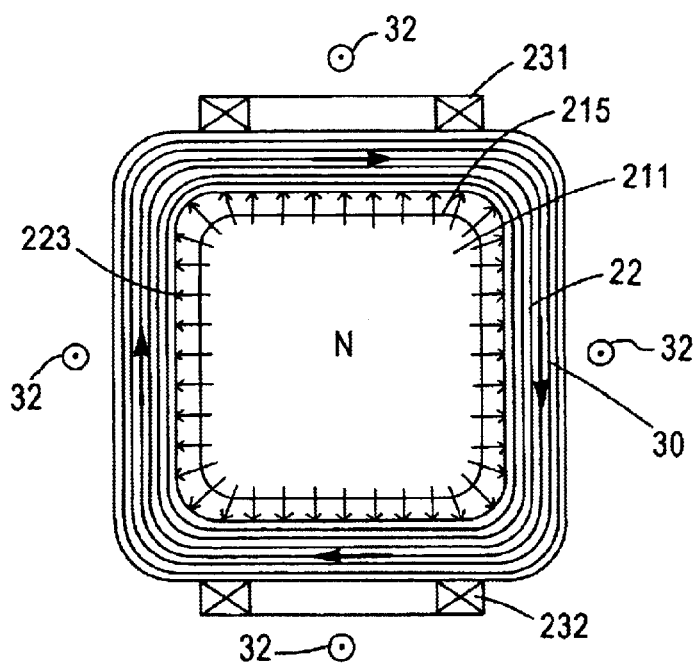
Figure 4C:
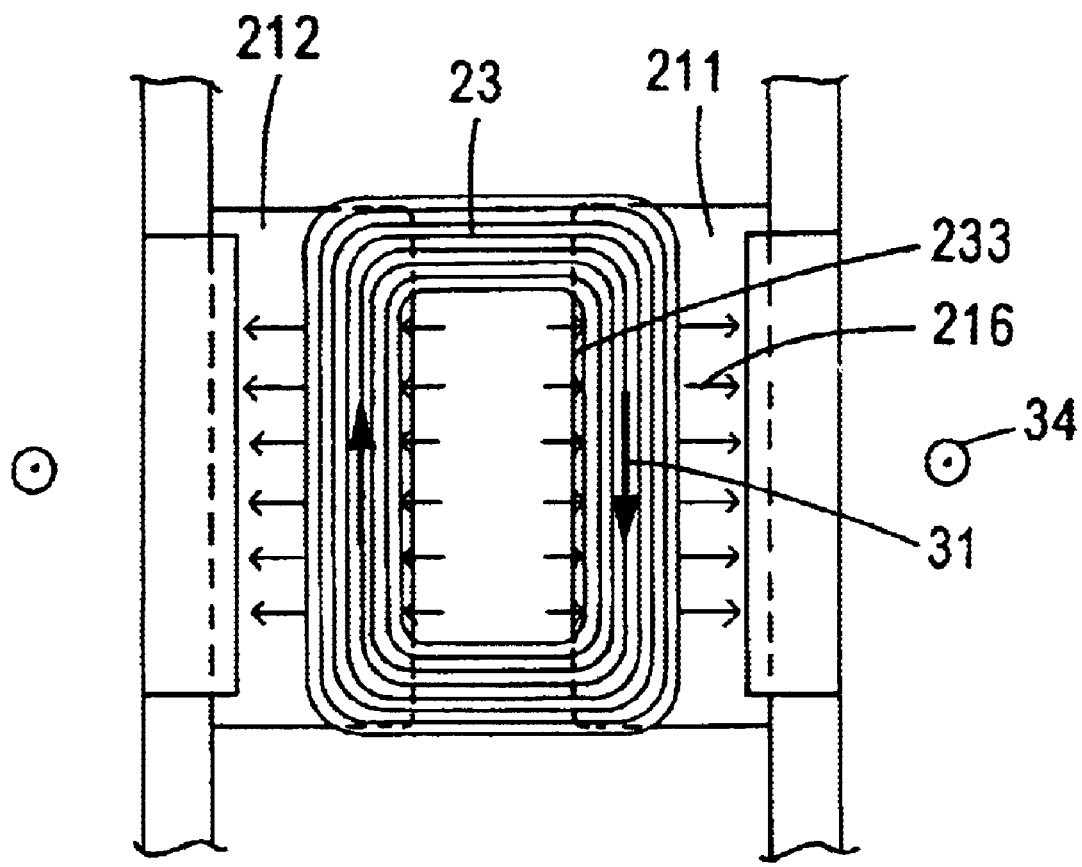
Figure 5A:
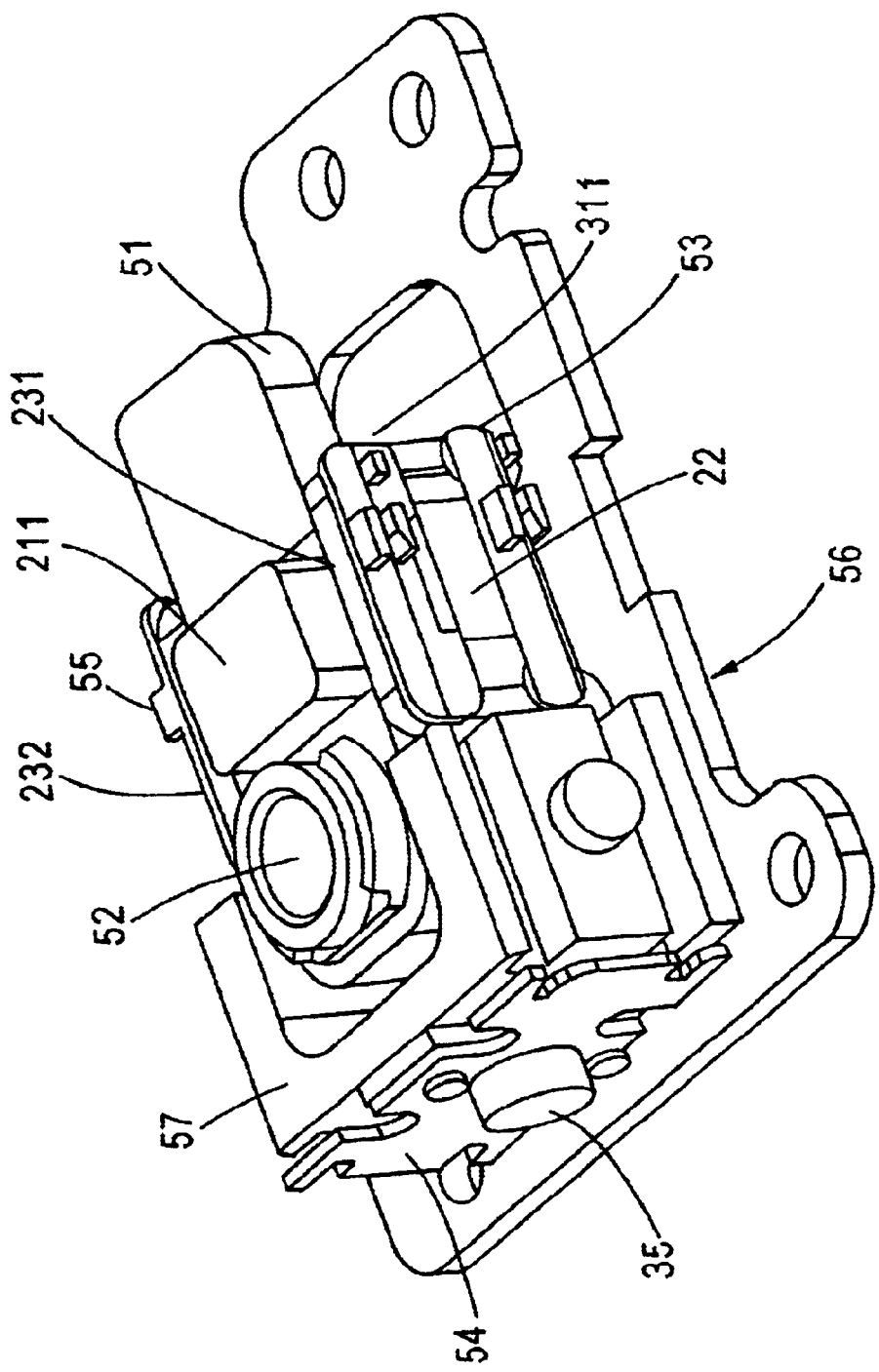
FIG. 5A is a perspective view schematically showing the integration of an electromagnetic actuator according to the present invention with an objective lens holder into an optical head.
Figure 5B:
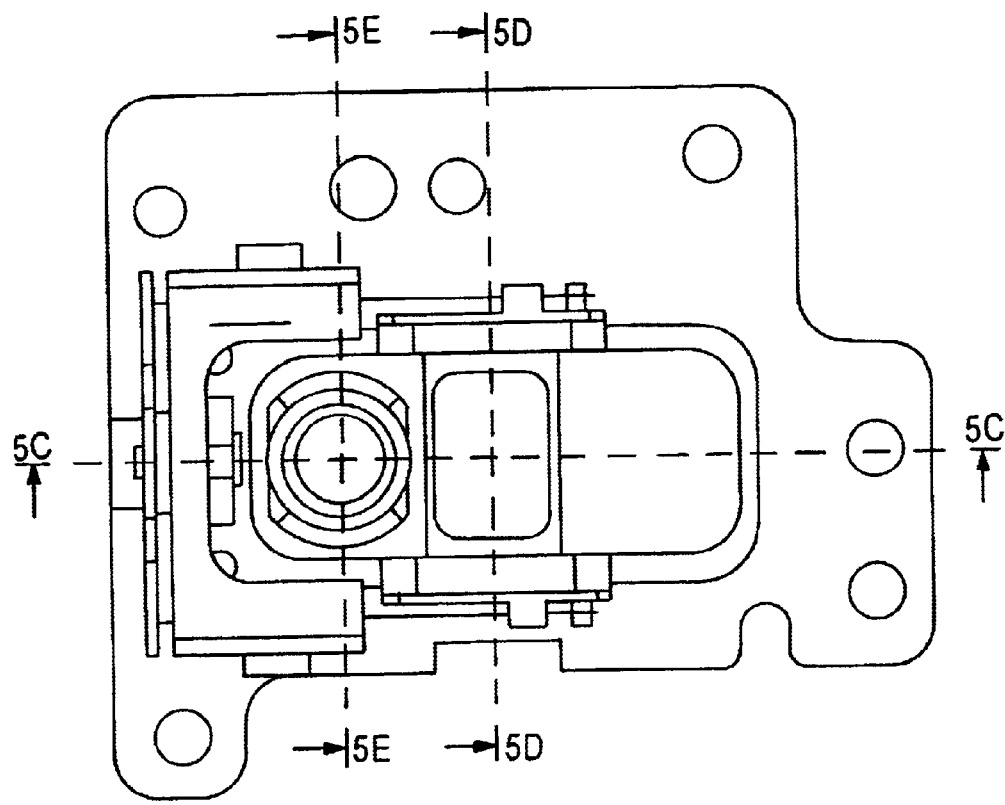
FIG. 5B is a top plane view of FIG. 5A.
Figure 5C:
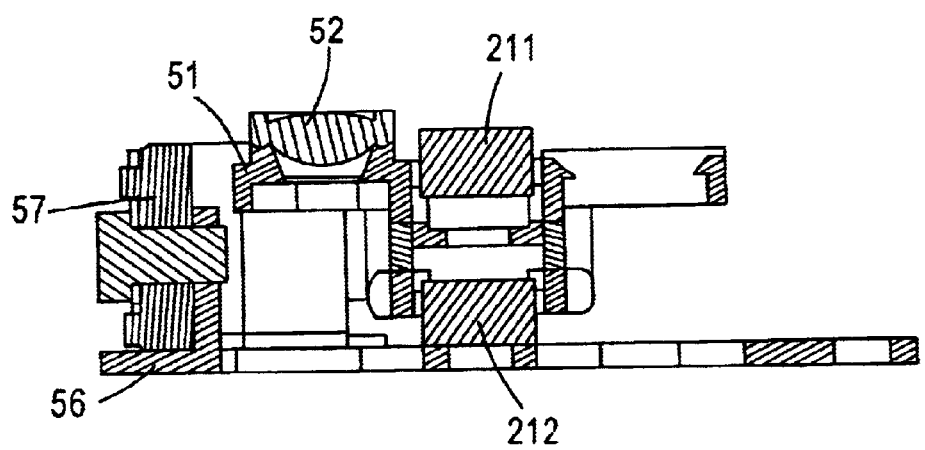
FIGS. 5C~5E are cross-sectional views taken along C–C', D–D' and E–E' lines of FIG. 5A, respectively.
Figure 5D:
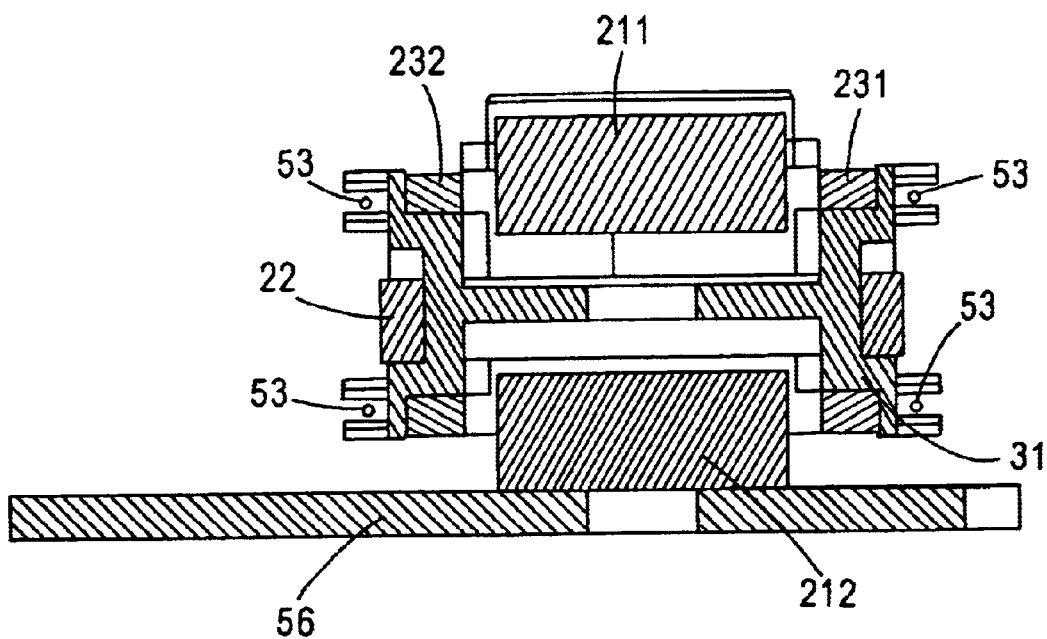
Figure 5E:
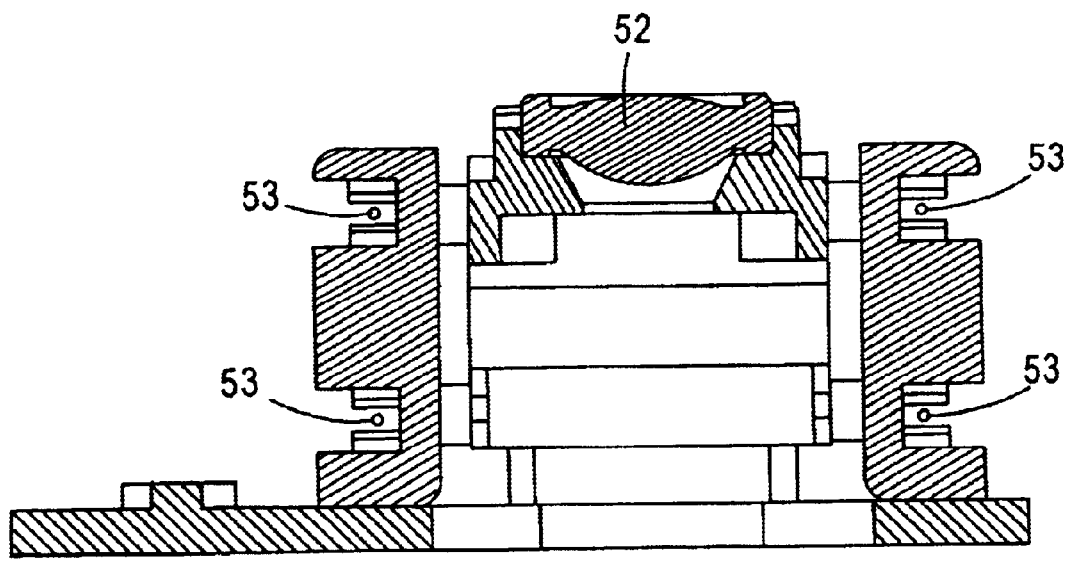

Please refer to FIGS. 4A~4C which schematically show a preferred embodiment of an electromagnetic actuator according to the present invention. The electromagnetic actuator includes a magnetic force line generator 21, a first actuating coil set 22 and a second actuating coil set 23. The magnetic force line generator 21 provides magnetic forces for the actuating coil sets 22 and 23. The actuating coil sets 22 and 23 are connected to an object (not shown) and move the object in response to the magnetic forces and currents applied thereinto. By controlling the density and the direction of a current in a coil, as indicated by arrows 30 or 31 in FIG. 4B or 4C, the level and the direction of the movement is controlled. For example, if the directions of the magnetic force and the current applied to the coil set 22 are respectively indicated by those thin and thick arrows in FIG. 4B, the coil set 22 will vertically move upwards from the paper position, as indicated by the symbol with a reference numeral 32. Likewise, if the directions of the magnetic force and the current applied to the coil set 23 are respectively indicated by those thin and thick arrows in FIG. 4C, the coil set 23 will vertically move upwards from the paper position, as indicated by the symbol with a reference numeral 34.

The magnetic force line generator 21 includes two spaced permanent magnets 211 and 212 with respective homopolar parts 213 and 214 facing with each other. Between the two homopolar parts 213 and 214, there exists a small clearance d. In this embodiment, the homopolar parts are respective N poles of the two magnetic magnets. Alternatively, the two permanent magnets 211 and 212 may have respective S poles thereof facing each other as the two homopolar parts 213 and 214. Under this circumstances, changing the directions of the currents in the coils may achieve the same movement effects. Owing to the repelling force and the small clearance between the two homopolar parts, the magnetic force lines generated by the two permanent magnets are compressed so as to include a first smooth portion 215 and a second smooth portion 216 which are preferably linear. The first actuating coil set 22 includes a coil surrounding the homopolar parts 213 and 214, and passing therethrough the first linear portion of magnetic force lines 215. The second actuating coil set 23 includes two coils 231 and 232 disposed at two opposite sides of the homopolar parts 213 and 214 to sandwich the homopolar parts 213 and 214 therebetween, and passing therethrough the second linear portion of magnetic force lines 216. By arranging the actuating coils 22 and 23 at properly positions and orientation, the coil walls 223 and 233 are desirably made to be perpendicular to the linear portions 215 and 216 of the magnetic force lines, respectively, so that the utilization rate of the magnetic circuit of the electromagnetic actuator is maximized. For example, the utilization rate for the first coil set 22 is almost 100%, and that for the second coil set 23 can be up to 80%, and 70%~80% in general. The result is apparent to be superior to the conventional ones.

Please refer to FIGS. 5A~5E which schematically show the integration of an electromagnetic actuator according to the present invention with an objective lens holder into an optical head. As shown in the drawings, the optical head 50 includes a lens holder 51 for holding an objective lens 52 therein, four suspending copper wires 53 for supporting the lens holder 51 in a suspending state, a circuit board 54 welded thereon the copper wires 53 and screwed to a lower yoke 56, and an electromagnetic actuator 55 connected to the lens holder 51 for moving the objective lens 52 on micro levels along a focusing direction F and/or a tracking direction T. Using the embodiment of FIG. 4 as the electromagnetic actuator 55 herein, the two spaced permanent magnets 211 and 212 are secured to an upper yoke (not shown) and the lower yoke 56, respectively, and the positions of the coils 22, 231 and 232 are also illustrated with reference to FIGS. 5A, 5C and 5D. Further, a damping device 57 filled with a damping agent is used to provide a proper damping coefficient for the lens holder 51 upon vibration.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An electromagnetic actuator for moving an object along a first direction and a second direction, comprising:

a magnetic force line generator including two homopolar parts spaced with a clearance small enough for generating magnetic force lines including a first substantially linear portion and a second substantially linear portions due to a repelling force between said two homopolar parts, wherein said first and second substantially linear portion are not parallel;

a first actuating coil set connected to said object and arranged around said magnetic force line generator with a coil wall thereof substantially perpendicular to said first substantially linear portion for moving said object in said first direction in response to a first current density therein and said first substantially linear portion; and a second actuating coil set connected to said object and located at the lateral end of said magnetic force line generator with a coil wall thereof substantially perpendicular to said second substantially linear portion for moving said object in said second direction in response to a second current density therein and said second substantially linear portion, wherein said first and second actuating coil sets are not substantially parallel.

2. The electromagnetic actuator according to claim 1 wherein said first direction is a focusing direction, and said first actuating coil set includes a coil surrounding said magnetic force line generator.

3. The electromagnetic actuator according to claim 2 wherein said second direction is a tracking direction, and said second actuating coil set includes two coils positioned at two opposite sides of said magnetic force line generator.

4. The electromagnetic actuator according to claim 1 wherein said magnetic force line generator includes two permanent magnets having respective N poles facing each other as said two homopolar parts.

5. The electromagnetic actuator according to claim 1 wherein said magnetic force line generator includes two permanent magnets having respective S poles facing each other as said two homopolar parts.

6. The electromagnetic actuator according to claim 1 for moving said object along said first and said second directions on micro levels.

7. The electromagnetic actuator according to claim 6 wherein said object as an objective lens holder of an optical head of an information writing/reading apparatus.

8. An electromagnetic actuator for moving an object along a first direction and a second direction, comprising:

a first actuating coil set connected to said object for generating a first actuating force to move said object in said first direction in response to a first current density therein and a first magnetic force;

a second actuating coil set connected to said object for generating a second actuating force to move said object in said second direction in response to a second current therein and a second magnetic force, wherein said first and second actuating coil sets are not substantially parallel; and a magnetic force line generator including two spaced homopolar parts which is surrounded by said first actuating coil set, and sandwiched by said second actuating coil set for providing said first and said second magnetic forces for said first and said second actuating coil sets, respectively, by generating magnetic force lines due to a repelling force therebetween, wherein said first and second magnetic forces are not substantially parallel.

9. The electromagnetic actuator according to claim 8 wherein said first direction is a focusing direction, and said second direction is a tracking direction.

10. The electromagnetic actuator according to claim 9 wherein said first actuating coil set includes a coil holding said magnetic force line generator therein and said second actuating coil set consists of two coils disposed at two opposite sides of said magnetic force line generator, respectively.

11. The electromagnetic actuator according to claim 8 wherein said magnetic force lines includes a first substantially linear portion substantially perpendicular to a coil wall of said first actuating coil set, and a second substantially linear portion substantially perpendicular to a coil wall of said second actuating coil set.

12. The electromagnetic actuator according to claim 8 wherein said object is an objective lens holder of an optical head of an information writing/reading apparatus.

13. The electromagnetic actuator according to claim 12 for moving said object along said first and said second directions on micro levels.

14. The electromagnetic actuator according to claim 13 wherein said magnetic force line generator includes two permanent magnets having respective homopoles facing each other as said two homopolar parts.

* * * * *